(12) United States Patent
Chung et al.

(10) Patent No.: US 11,186,321 B2
(45) Date of Patent: Nov. 30, 2021

(54) LOAD ABSORBING STRUCTURE FOR VEHICLE

(71) Applicants: Hyundai Motor Company, Seoul (KR); Kia Motors Corporation, Seoul (KR)

(72) Inventors: Hee Seouk Chung, Gyeonggi-do (KR); Hyun Sik Kim, Seoul (KR); Byeong Cheon Lee, Seoul (KR); Ji Na Son, Gyeonggi-do (KR); Deok Hwa Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/847,227

(22) Filed: Apr. 13, 2020

(65) Prior Publication Data

US 2021/0316793 A1    Oct. 14, 2021

(51) Int. Cl.
| | | |
|---|---|---|
| *B62D 25/08* | (2006.01) | |
| *B62D 25/02* | (2006.01) | |
| *B62D 21/03* | (2006.01) | |
| *B62D 21/15* | (2006.01) | |
| *B62D 25/04* | (2006.01) | |

(52) U.S. Cl.
CPC ............ *B62D 25/08* (2013.01); *B62D 21/03* (2013.01); *B62D 21/152* (2013.01); *B62D 25/025* (2013.01); *B62D 25/04* (2013.01)

(58) Field of Classification Search
CPC ...... B62D 25/02; B62D 25/025; B62D 25/08; B62D 25/2009; B62D 25/2018; B62D 25/2045; B62D 25/04; B62D 25/152; B62D 21/03; B62D 21/052
USPC .............................. 296/203.01, 203.02, 204
See application file for complete search history.

(56) References Cited

U.S. PATENT DOCUMENTS

| | | | |
|---|---|---|---|
| 2014/0284125 A1 | 9/2014 | Katayama et al. | |
| 2018/0236863 A1* | 8/2018 | Kawabe | B62D 25/025 |

FOREIGN PATENT DOCUMENTS

| | | |
|---|---|---|
| JP | 2000085626 A | 3/2000 |
| JP | 2008174181 A | 7/2008 |

* cited by examiner

*Primary Examiner* — Dennis H Pedder
(74) *Attorney, Agent, or Firm* — Mintz Levin Cohn Ferris Glovsky and Popeo, P.C.; Peter F. Corless

(57) ABSTRACT

A load absorbing structure for a vehicle is provided. The structure includes a pair of front side members that are spaced apart from each other in a width direction of the vehicle on a front side of the vehicle and a pair of side sills that are connected to the front side members, respectively. A pair of front pillars are connected to the side sills, respectively and a pair of connection members connect the front side members and the side sills corresponding thereto in a longitudinal direction of the vehicle, respectively. A battery cross member is disposed transverse between the pair of connection members and a bottom surface of the battery cross member is disposed lower than a bottom wall of each connection member.

8 Claims, 8 Drawing Sheets

LOAD ABSORBING STRUCTURE FOR VEHICLE

TECHNICAL FIELD

The present disclosure relates to a load absorbing structure for a vehicle, and more particularly, to a load absorbing structure for a vehicle, capable of effectively absorbing an impact load generated in a frontal collision of the vehicle to protect a battery and improve driving performance of the vehicle.

BACKGROUND

An electric vehicle includes a high-voltage battery mounted on the bottom of a passenger compartment. A battery case of the high-voltage battery may have a front mounting block on a front end thereof, and the front mounting block of the battery case may be coupled to a dash lower member disposed at a lower portion of a dash panel. To increase mounting stiffness of the battery case, a plurality of reinforcing members may be coupled to the dash lower member.

In an existing electric vehicle, however, the plurality of reinforcing members are coupled to the dash lower member, resulting in increased weight and manufacturing cost. During a frontal collision of the electric vehicle, impact energy (e.g., impact load) may cause a front subframe, a front wheel suspension, a plurality of power electronics, and the like to hit the battery case of the high-voltage battery, which may damage the high-voltage battery and cause a fire.

The above information described in this background section is provided merely to assist in understanding the background of the inventive concept, and may include any technical concept which is not considered as the prior art that is already known to those skilled in the art.

SUMMARY

The present disclosure provides a load absorbing structure for a vehicle capable of effectively absorbing an impact load generated in a frontal collision of the vehicle to protect a battery and improve driving performance of the vehicle.

According to an aspect of the present disclosure, a load absorbing structure for a vehicle may include: a pair of front side members spaced apart from each other in a width direction of the vehicle on a front side of the vehicle; a pair of side sills connected to the front side members, respectively; a pair of front pillars which are connected to the side sills, respectively; a pair of connection members which connect the front side members and the side sills corresponding thereto in a longitudinal direction of the vehicle, respectively; and a battery crossmember transverse between the pair of connection members. A bottom surface of the battery cross member may be disposed lower than a bottom wall of each connection member.

The connection member may include a receiving pocket configured to receive each end portion of the battery cross member. The receiving pocket may have a channel-shaped cross section with an open top. The receiving pocket may have a front wall facing a front end of the connection member, a bottom wall downwardly recessed from the bottom wall of the connection member, a rear wall facing a rear end of the connection member, and a sidewall facing an interior space of the vehicle. A front surface of the battery cross member may be supported by the front wall of the receiving pocket, the bottom surface of the battery cross member may be supported by the bottom wall of the receiving pocket, and a rear surface of the battery cross member may be supported by the rear wall of the receiving pocket.

A subframe may be mounted on the bottom wall of the connection member to dispose the subframe in front of the receiving pocket. The battery cross member may support a front end of a battery case. The battery case may include a mounting block fastened to the battery cross member using a fastener. The battery cross member may include at least one reinforcing rib, and the reinforcing rib may extend in a longitudinal direction of the battery crossmember.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
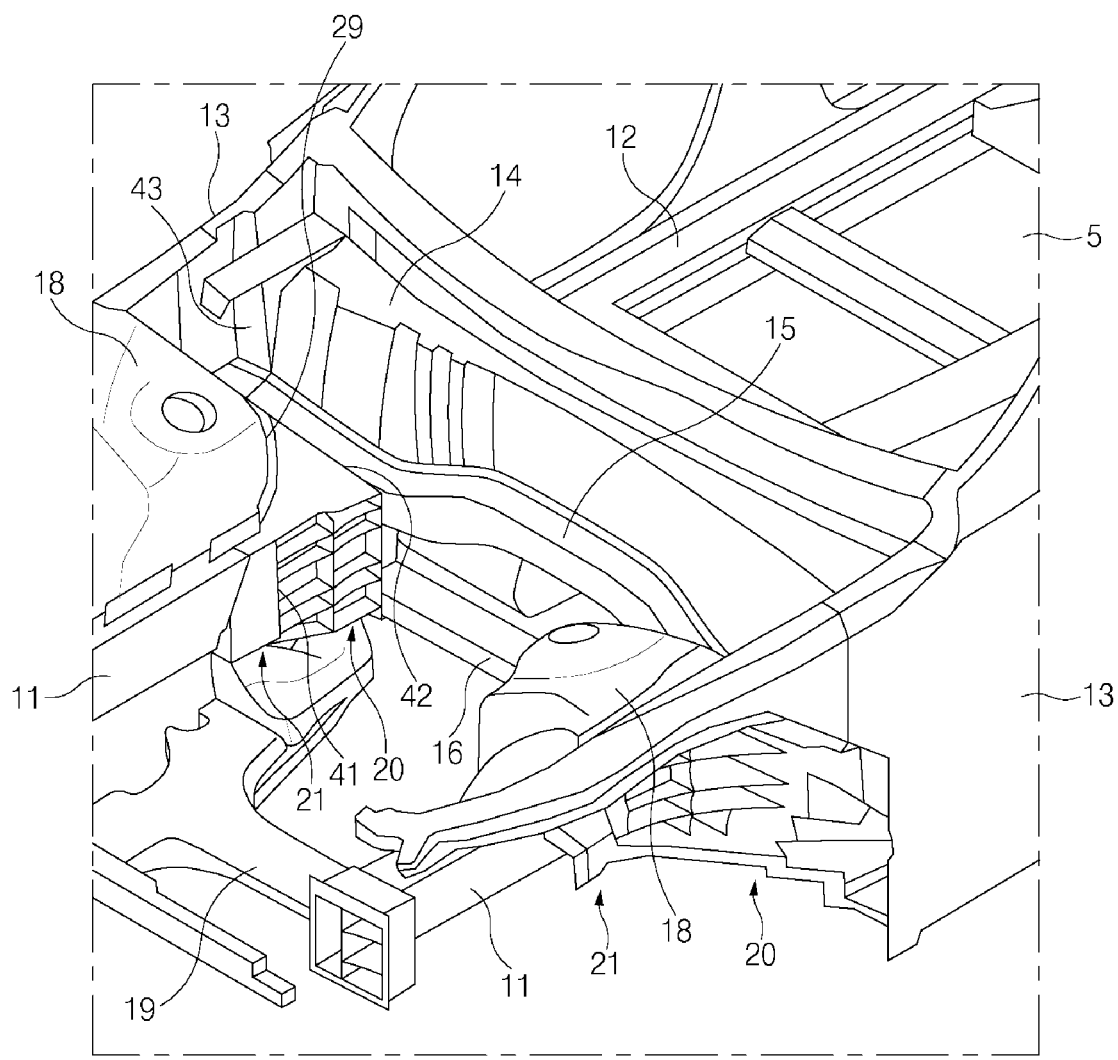
FIG. 1 illustrates a perspective view of a load absorbing structure for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
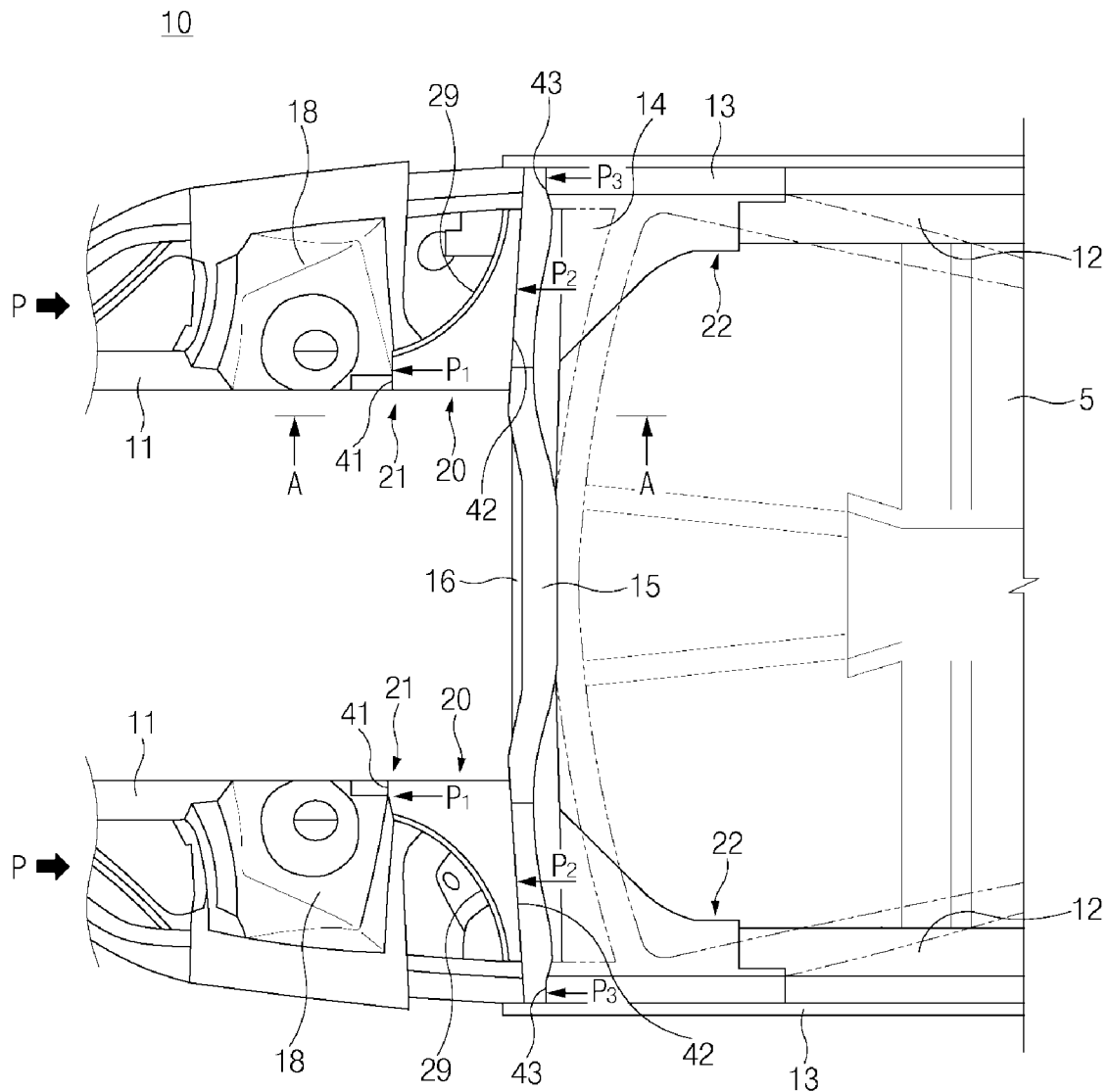
FIG. 2 illustrates a plan view of a load absorbing structure for a vehicle according to an exemplary embodiment of the present disclosure.

Referring to FIGS. 1 and 2, a load absorbing structure 10 for a vehicle according to an exemplary embodiment of the present disclosure may include a pair of front side members 11 spaced apart from each other in a width direction of the vehicle on the front side of the vehicle, a pair of side sills 12 connected to the front side members 11, respectively, a pair of front pillars 13 connected to the side sills 12, respectively, a pair of connection members 20 which connect the front side members 11 and the side sills 12 corresponding thereto in a longitudinal direction of the vehicle, respectively, and a battery cross member 16 which is transverse between the pair of connection members 20.

Figure 3:
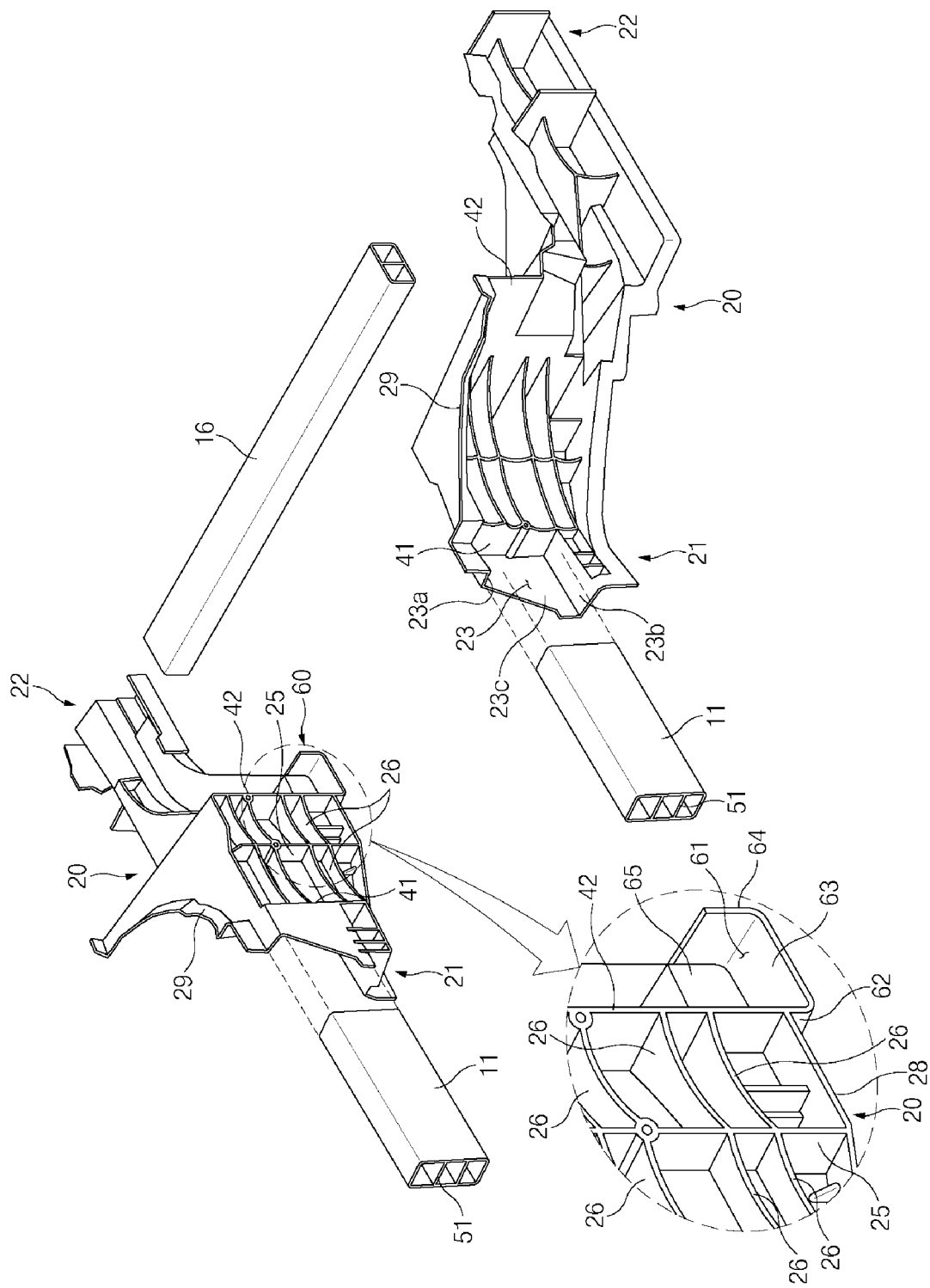
FIG. 3 illustrates an exploded perspective view of a load absorbing structure for a vehicle according to an exemplary embodiment of the present disclosure.

The front side members 11 may extend along the longitudinal direction of the vehicle, each having a front end and a rear end. A bumper may be connected between the front ends of the pair of front side members 11. The rear ends of the front side members 11 may be connected to front ends of the side sills 12 via the connection members 20, respectively. As illustrated in FIG. 3, each front side member 11 may include a plurality of first reinforcing ribs 51 that extend along the longitudinal direction of the vehicle.

Additionally, the side sills 12 may be coupled to a floor 5 of the vehicle. The front ends of the side sills 12 may be connected to the rear ends of the front side members 11 via the connection members 20, respectively. The front pillars 13 may be connected to the outer sides of the connection members 20 and the front ends of the side sills 12, respectively. A dash panel 14 may be connected between the pair of front pillars 13, and a dash cross member 15 may be disposed in front of the dash panel 14. End portions of the dash cross member 15 may be connected to the connection members 20 and the front pillars 13, respectively. Thus, an impact load transmitted through the pair of front side members 11 may be distributed by the dash cross member 15.

Figure 6:
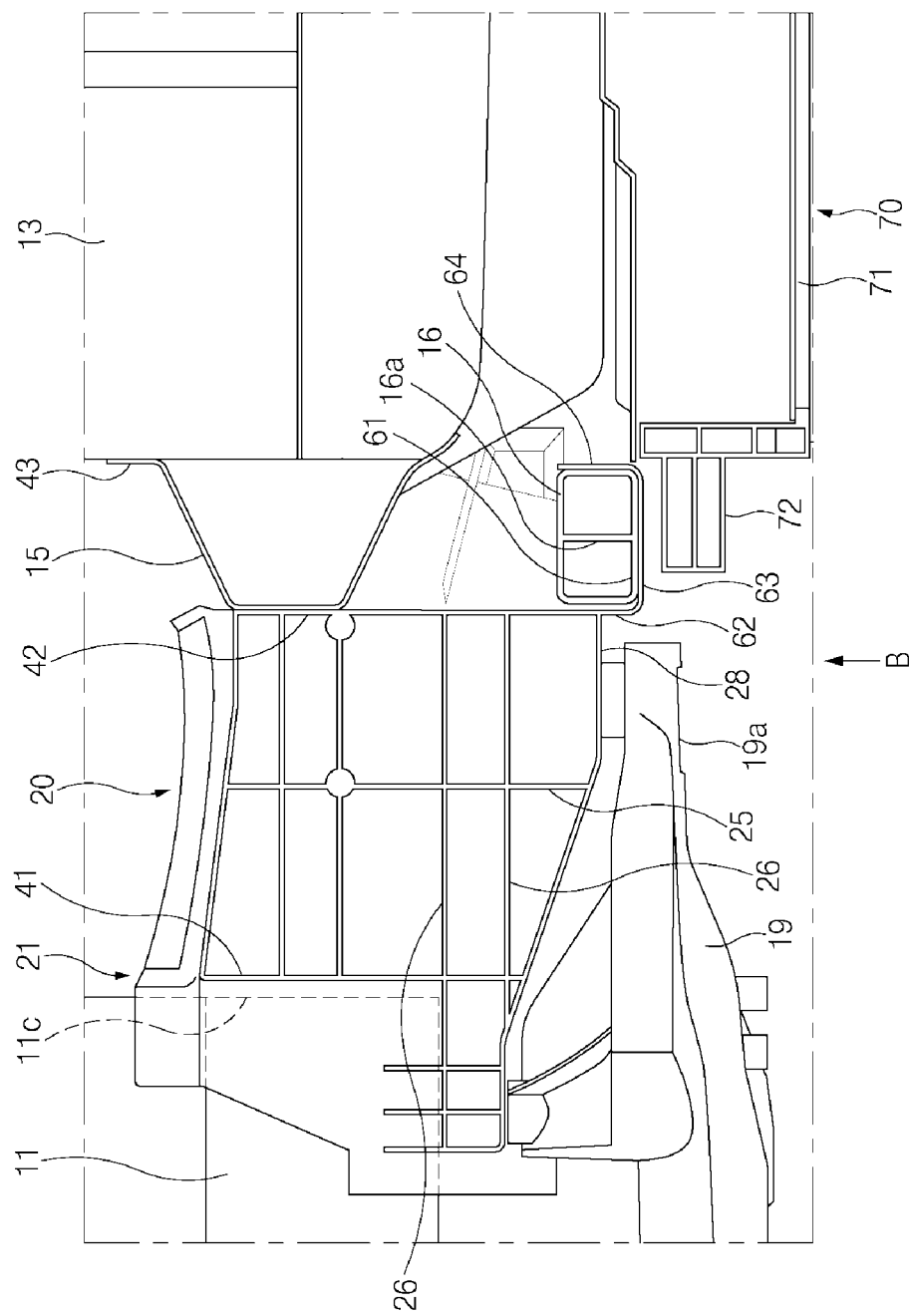
FIG. 6 illustrates a cross-sectional view, taken along line A-A of FIG. 2 according to an exemplary embodiment of the present disclosure.

As illustrated in FIGS. 2 and 3, each connection member 20 may include a first connecting portion 21 to which the rear end of the front side member 11 is connected, and a second connecting portion 22 to which the front end of the side sill 12 is connected. As illustrated in FIG. 6, each connection member 20 may include a first abutting wall 41 to which a rear end surface 11c of the front side member 11 may be overlapped and joined, and a second abutting wall 42 to which each end portion of the dash cross member 15 may be overlapped and joined. The first connecting portion 21 may include a receiving space 23 into which the rear end of the front side member 11 may be received, and the receiving space 23 may be disposed in a front end of the first connecting portion 21. The receiving space 23 may be defined by the first abutting wall 41, a top wall 23a, a bottom wall 23b, and a sidewall 23c.

A front surface of the first abutting wall 41 may contact the rear end surface 11c of the front side member 11. The front surface of the first abutting wall 41 and the rear surface 11c of the front side member 11 may be joined by butt welding, by the present disclosure is not limited thereto and other joining techniques may be used. In other words, the rear end of the front side member 11 may be overlapped and joined to the first abutting wall 41 of the connection member 20. When an impact load P generated in a frontal collision of the vehicle is transmitted to the first abutting wall 41 via the front side member 11, a reaction force P1 may be exerted by the rear end surface 11c of the front side member 11 and the first abutting wall 41, and thus part of the impact load P may be primarily absorbed by the connection member 20 to thus primarily eliminate part of the impact load P. The rest of the impact load P may be transmitted to the dash cross member 15 through the connection member 20.

The second abutting wall 42 may be formed between the first connecting portion 21 and the second connecting portion 22, and a front surface of each end portion of the dash cross member 15 may be in surface contact with the second abutting wall 42. The front surface of the end portion of the dash cross member 15 and the second abutting wall 42 may be joined by butt welding. In other words, the dash cross member 15 may be overlapped and joined to the second abutting wall 42 of the connection member 20.

Furthermore, when part of the impact load P, which is not absorbed by the connection member 20 and eliminated, is transmitted to the second abutting wall 42 and the end portion of the dash cross member 15 through the connection member 20, a reaction force P2 may be exerted by the dash crossmember 15 and the second abutting wall 42, and thus part of the impact load P may be secondarily absorbed by the dash cross member 15 to thus secondarily eliminate part of the impact load P. The rest of the impact load P may be transmitted to the front pillar 13 through the dash cross member 15.

The front pillar 13 may have a third abutting wall 43 formed on the front thereof, and a rear surface of each end portion of the dash cross member 15 may contact a front surface of the third abutting wall 43. The rear surface of the end portion of the dash cross member 15 and the third abutting wall 43 may be joined by butt welding. In other words, the dash cross member 15 may be overlapped and joined to the third abutting wall 43 of the front pillar 13.

When part of the impact load P, which is not absorbed by the dash cross member 15 and eliminated, is transmitted to the third abutting wall 43 and the end portion of the dash cross member 15 through the dash cross member 15, a reaction force P3 may be exerted by the dash cross member 15 and the third abutting wall 43, and thus part of the impact load P may be thirdly absorbed by the front pillar 13 to thus thirdly eliminate part of the impact load P. The rest of the impact load P may be transmitted to the side sill 12 through the second connecting portion 22 of the connection member 20.

Each connection member 20 may include a flange 29 to which a damper housing 18 may be joined, and a suspension may be connected to the damper housing 18. Accordingly, the connection member 20 may support the front side member 11 and the damper housing 18, thereby effectively preventing the impact load from being transmitted to a passenger compartment of the vehicle during the frontal collision of the vehicle.

Figure 4:
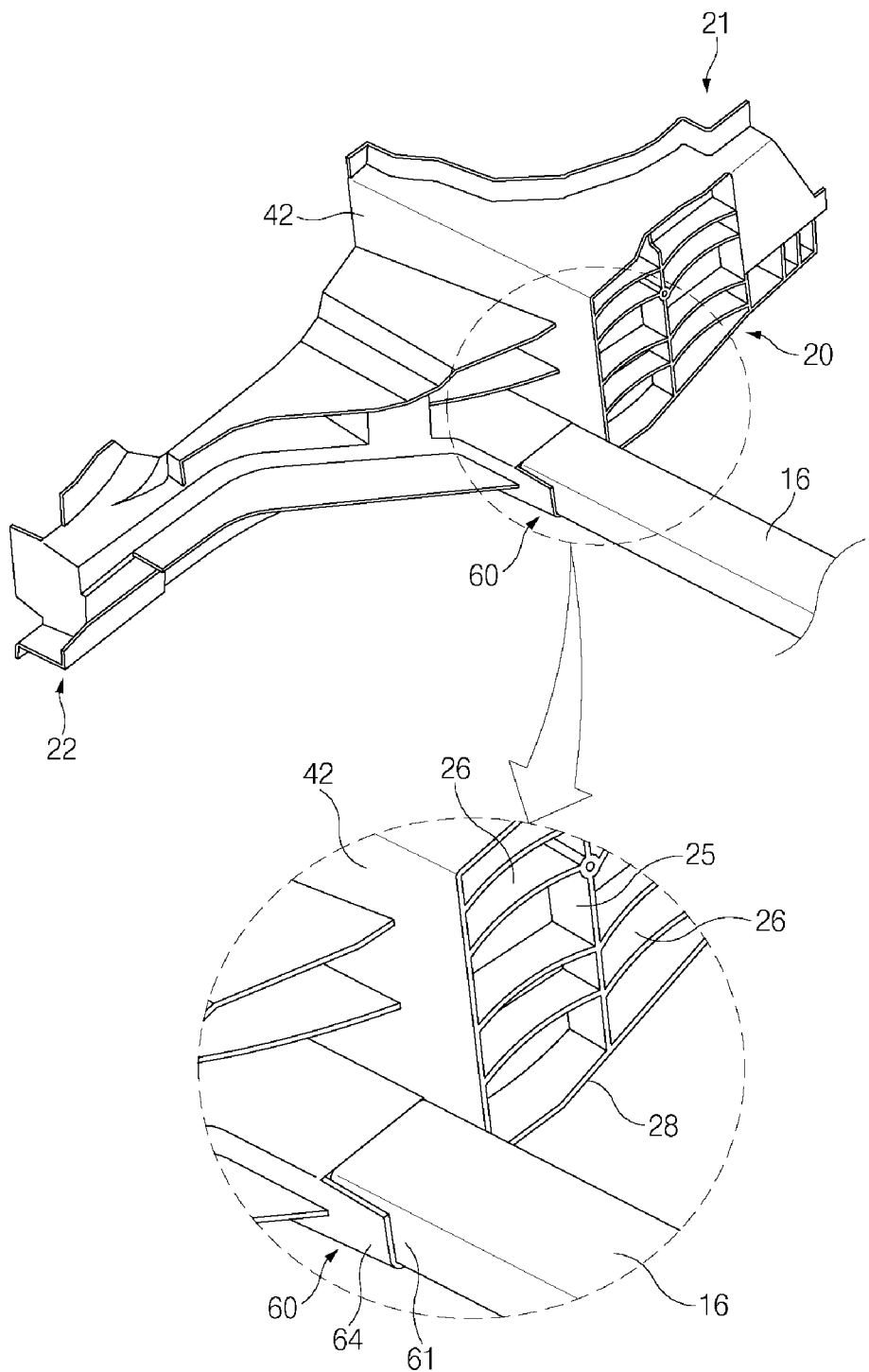
FIG. 4 illustrates a perspective view of a connection member and a battery cross member in a load absorbing structure for a vehicle according to an exemplary embodiment of the present disclosure.

As illustrated in FIGS. 3 and 4, each connection member 20 may include a vertical rib 25 and a plurality of reinforcing ribs 26 that connect between the first abutting wall 41 and the second abutting wall 42. The vertical rib 25 may extend vertically, and each reinforcing rib 26 may extend horizontally. As the reinforcing rib 26 extends from the first abutting wall 41 to the second abutting wall 42, the reinforcing rib 26 may connect the first abutting wall 41 and the second abutting wall 42, and the reinforcing rib 26 may extend through the vertical rib 25. In particular, the plurality of reinforcing ribs 26 may lie at right angles to the first and second abutting walls 41 and 42 to thus more easily distribute and absorb the impact load transmitted from the first abutting wall 41 to the second abutting wall 42.

As illustrated in FIGS. 1 and 3, the battery cross member 16 may be transverse to the pair of connection members 20. In particular, as illustrated in FIGS. 6 to 8, a bottom surface of the battery cross member 16 may be disposed lower than a bottom wall 28 of the connection member 20 (e.g., at a lower height than the bottom wall), and thus the impact load generated in the collision of the vehicle may be prevented from being transmitted to the battery cross member 16.

Figure 7:
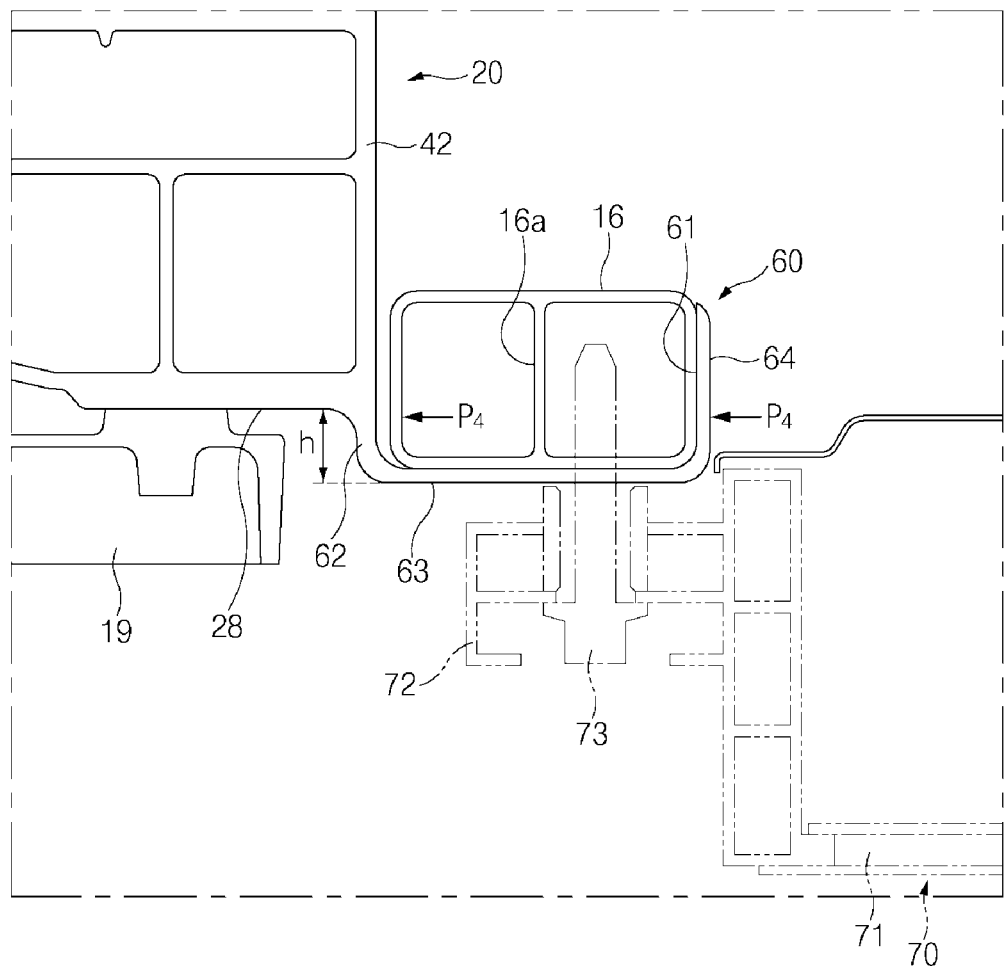
FIG. 7 illustrates an enlarged view of a receiving pocket in a load absorbing structure for a vehicle according to an exemplary embodiment of the present disclosure.
Figure 8:
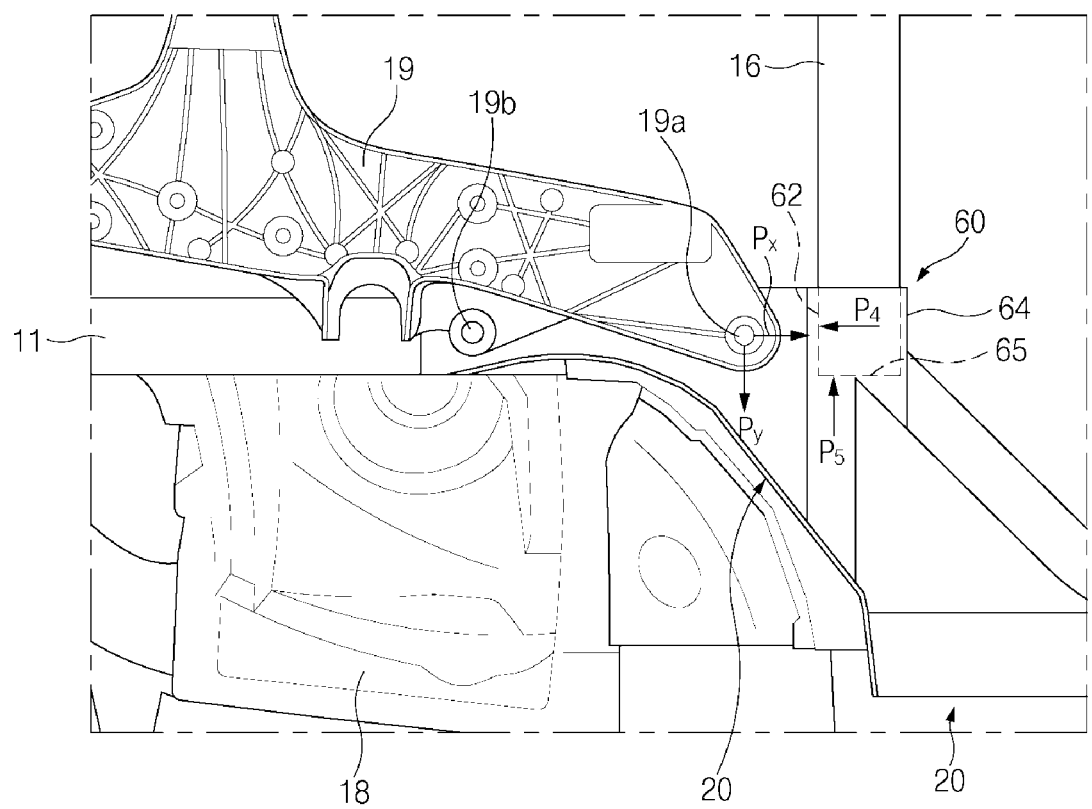
FIG. 8 illustrates a view, which is viewed from a direction indicated by arrow B of FIG. 6 according to an exemplary embodiment of the present disclosure.

As illustrated in FIGS. 6 and 7, a battery case 71 of a battery assembly 70 may include a front mounting block 72 formed on a front end thereof, and the front mounting block 72 may protrude from the front end of the battery case 71 toward the front of the vehicle. The front mounting block 72 may be fastened to the battery crossmember 16 using a fastener 73c and thus, the front end of the battery case 71 may be supported to the battery crossmember 16. In addition, the battery cross member 16 may include at least one reinforcing rib 16a, and the reinforcing rib 16a may extend along a longitudinal direction of the battery cross member 16.

Figure 5:
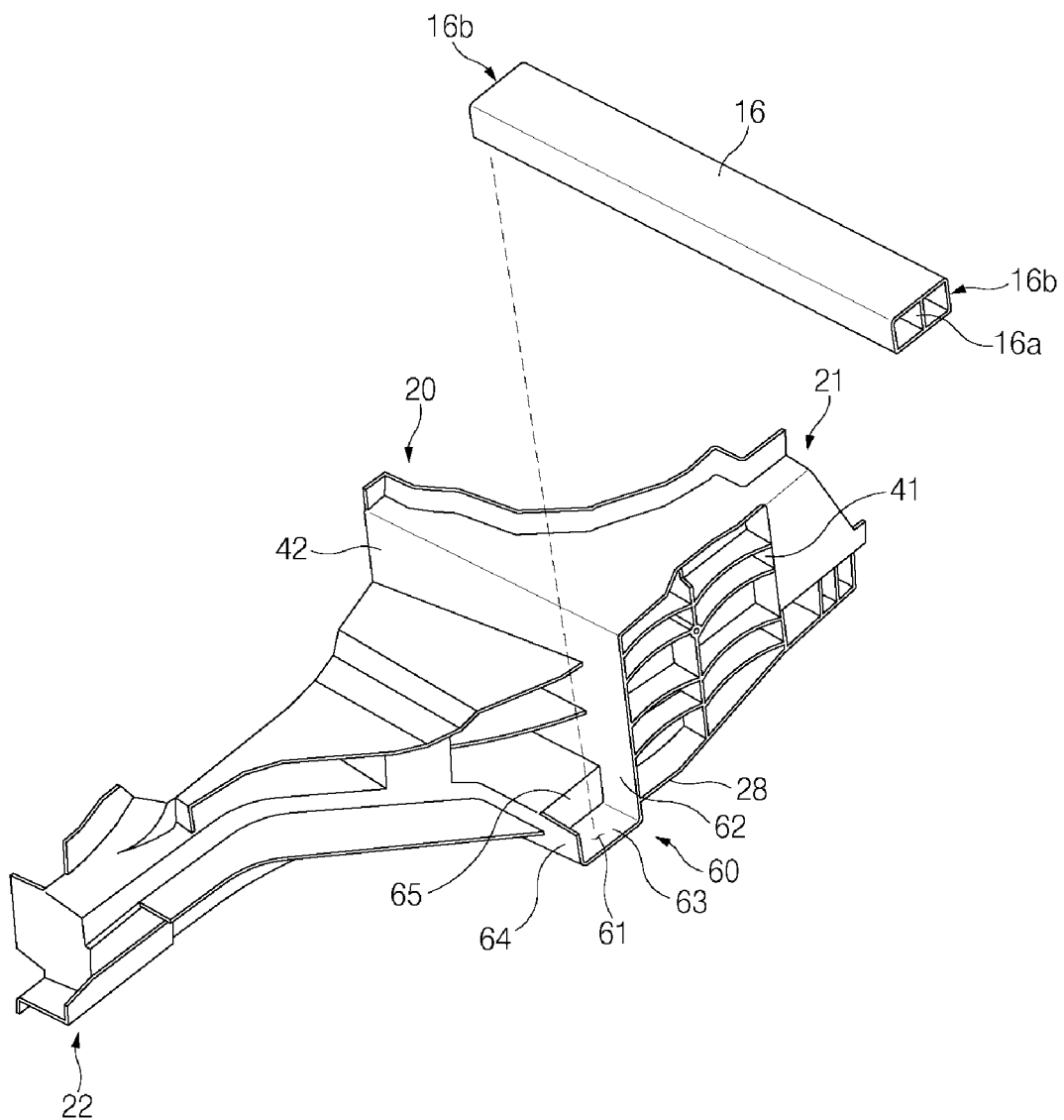
FIG. 5 illustrates an exploded perspective view of a connection member and a battery cross member in a load absorbing structure for a vehicle according to an exemplary embodiment of the present disclosure.

Referring to FIGS. 3 to 8, each connection member 20 may include a receiving pocket 60 configured to receive the end portion of the battery cross member 16. The end portions of the battery cross member 16 may be coupled to the receiving pockets 60 of the connection members 20 by welding and/or using fasteners, respectively. The receiving pocket 60 may have a channel-shaped cross section with an open top. As illustrated in FIGS. 3 and 5, the end portion of the battery cross member 16 may be inserted into the receiving pocket 60 in a top down manner, and the assembly and mounting thereof may be significantly facilitated. In other words, the end portion of the battery cross member 16 may be lowered into the receiving pocket 60 from the open top.

In particular, the receiving pocket 60 may have a front wall 62 facing a front end of the connection member 20, a bottom wall 63 downwardly recessed from the bottom wall 28 of the connection member 20, a rear wall 64 facing a rear end of the connection member 20, and a sidewall 65 facing an interior space of the vehicle, and a receiving space 61 of the receiving pocket 60 may be defined by the front wall 62, the bottom wall 63, the rear wall 64, and the sidewall 65. A front surface of the battery cross member 16 may be supported by the front wall 62 of the receiving pocket 60, and the bottom surface of the battery cross member 16 may be supported by the bottom wall 63 of the receiving pocket 60. A rear surface of the battery cross member 16 may be supported by the rear wall 64 of the receiving pocket 60, and an end surface 16b of the battery cross member 16 may be supported by the sidewall 65 of the receiving pocket 60.

As illustrated in FIGS. 6 to 8, the front wall 62 may extend downwardly from the bottom wall 28 of the connection member 20. The front wall 62 may extend downwardly from the second abutting wall 42. Thus, the bottom wall 63 may be recessed from the bottom wall 28 of the connection member 20 by a predetermined distance h. In particular, as the bottom surface of the battery cross member 16 contacts the bottom wall 63 of the receiving pocket 60, the bottom surface of the battery cross member 16 may be disposed lower than the bottom wall 28 of the connection member 20.

To allow a subframe 19 to be disposed in front of the receiving pocket 60, a rear end of the subframe 19 may be mounted on the bottom wall 28 of the connection member 20. The rear end of the subframe 19 may be mounted on the bottom wall 28 of the connection member 20 through one or more mounting points 19a and 19b. When the subframe 19 is moved toward the battery of the vehicle due to the impact load generated in the frontal collision of the vehicle, the rear end of the subframe 19 may be blocked by the front wall 62 of the receiving pocket 60, and thus damage to the battery assembly 70 that may be caused by the subframe 19 may be effectively prevented.

In particular, when the impact load P is transmitted to the receiving pocket 60 via the connection member 20 and the subframe 19, a reaction force P4 may be exerted by the front wall 62 and the rear wall 64 of the receiving pocket 60, and thus the impact load may be absorbed and eliminated by the front wall 62 of the receiving pocket 60 and the battery cross member 16. By preventing the subframe 19 from thrusting into the battery assembly 70, damage to the battery assembly 70 may be prevented. Each end surface 16b of the battery cross member 16 may contact the sidewall 65 of the receiving pocket 60, and the sidewall 65 of the receiving pocket 60 may support the end surface 16b of the battery cross member 16.

Referring to FIG. 8, when a first load Px is transmitted from a front wheel of the vehicle to the receiving pocket 60 via the subframe 19 in the longitudinal direction of the vehicle during the driving of the vehicle, the reaction force P4 may be exerted by the front wall 62 and the rear wall 64 of the receiving pocket 60, and thus the first load Px of the subframe 19 may be supported. In addition, when a second load Py is transmitted to the receiving pocket 60 through the subframe 19 in the width direction of the vehicle during the driving of the vehicle, a reaction force P5 may be exerted by the sidewall 65 of the receiving pocket 60, and thus the second load Py of the subframe 19 may be supported.

When the first load Px and the second load Py, which are orthogonal to each other, are transmitted to the subframe 19 while the vehicle is being driven, the reaction forces P4 and P5 may be exerted by the front wall 62, the rear wall 64, and the sidewall 65 of the receiving pocket 60, and thus support stiffness with respect to the subframe 19 may be sufficiently obtained.

As set forth above, the load absorbing structure for a vehicle according to exemplary embodiments of the present disclosure may effectively absorb the impact load generated in the frontal collision of the vehicle, thereby protecting the battery and improving driving performance of the vehicle. In addition, the load absorbing structure according to exemplary embodiments of the present disclosure may significantly reduce the number of its components compared to the related art, thereby significantly reducing the weight and manufacturing cost thereof.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A load absorbing structure for a vehicle, comprising:
a pair of front side members are spaced apart from each other in a width direction of the vehicle on a front side of the vehicle;
a pair of side sills connected to the front side members, respectively;
a pair of front pillars connected to the side sills, respectively;
a pair of connection members that connect the front side members and the side sills corresponding thereto in a longitudinal direction of the vehicle, respectively; and
a battery cross member disposed transverse between the pair of connection members,
wherein a bottom surface of the battery cross member is disposed lower than a bottom wall of each connection member, and
wherein the connection member includes a receiving pocket configured to receive each end portion of the battery cross member.

2. The load absorbing structure according to claim 1, wherein the receiving pocket has a channel-shaped cross section with an open top.

3. The load absorbing structure according to claim 1, wherein the receiving pocket has a front wall facing a front end of the connection member, a bottom wall downwardly recessed from the bottom wall of the connection member, a rear wall facing a rear end of the connection member, and a sidewall facing an interior space of the vehicle.

4. The load absorbing structure according to claim 3, wherein a front surface of the battery cross member is supported by the front wall of the receiving pocket, the bottom surface of the battery cross member is supported by the bottom wall of the receiving pocket, and a rear surface of the battery cross member is supported by the rear wall of the receiving pocket.

5. The load absorbing structure according to claim 4, wherein a subframe is mounted on the bottom wall of the connection member to disposed the subframe in front of the receiving pocket.

6. The load absorbing structure according to claim 1, wherein the battery cross member supports a front end of a battery case.

7. The load absorbing structure according to claim 6, wherein the battery case includes a mounting block fastened to the battery cross member using a fastener.

8. The load absorbing structure according to claim 1, wherein the battery cross member includes at least one reinforcing rib, and the reinforcing rib extends in a longitudinal direction of the battery cross member.

* * * * *